United States Patent [19]
Pfeiffer

[11] 4,434,501
[45] Feb. 28, 1984

[54] X-RAY FILM CASSETTE
[75] Inventor: Wilfried Pfeiffer, Quickborn, Fed. Rep. of Germany
[73] Assignee: U.S. Philips Corporation, New York, N.Y.
[21] Appl. No.: 492,152
[22] Filed: May 9, 1983

Related U.S. Application Data

[63] Continuation of Ser. No. 378,299, May 14, 1982, abandoned.

[51] Int. Cl.³ .................. G03C 5/16; G03D 41/16
[52] U.S. Cl. ............................ 378/187; 378/188
[58] Field of Search .......... 378/185, 187, 188, 174, 378/173

[56] References Cited
U.S. PATENT DOCUMENTS
4,015,132 3/1977 Buschbeck et al. .................. 378/187
4,352,198 9/1982 Fukushima et al. ................. 378/185

FOREIGN PATENT DOCUMENTS
1454750 11/1976 United Kingdom .

Primary Examiner—Alfred E. Smith
Assistant Examiner—T. N. Grigsby
Attorney, Agent, or Firm—Marc D. Schechter

[57] ABSTRACT

An X-ray film cassette with a lid which is pivotable with respect to a bottom. Between the lid and the bottom is an X-ray film which bears on a pivotable film pressure plate. The film is retained clear of the bottom and the lid by means of springs which bear against the bottom as well as against the lid. The X-ray film has an edge region which projects from the film pressure plate so that it can be engaged by transport rollers. In the X-ray film cassette according to the invention, sticking of the X-ray film is avoided.

1 Claim, 2 Drawing Figures

X-RAY FILM CASSETTE

This is a continuation of application Ser. No. 378,299, filed May 14, 1982, now abandoned.

BACKGROUND OF THE INVENTION

The invention relates to an X-ray film cassette having a storage space for an X-ray film. The film is situated between a bottom and a lid which is pivotably connected to the bottom. The cassette further comprises a locking mechanism which defines the mutual positions of the bottom and the lid when the cassette is either open or closed. The cassette also comprises spring means which retain the X-ray film in a fixed position with respect to the bottom and the lid when the cassette is closed, and which release the X-ray film for transport from the cassette when the cassette is open.

For unloading a known X-ray film cassette of the kind described above (see British Pat. No. 1,454,750), the cassette is coupled, with its side which is to be opened directed downward, to a film development apparatus which also opens the cassette. To this end, the X-ray film should become loose in the cassette so that it drops between transport rollers of the film development apparatus under the influence of gravity.

It is a drawback of the known X-ray film cassette that it cannot be unloaded in the horizontal position. A further drawback is that after the cassette is opened, the X-ray film is liable to adhere to an intensifier screen contacted under pressure by the X-ray film in the closed condition of the cassette.

SUMMARY OF THE INVENTION

It is an object of the invention to provide an X-ray film cassette which can be unloaded in the horizontal positon and in which the X-ray film is less likely to adhere.

To this end, an X-ray film cassette according to the invention comprises at least one spring at the bottom of the cassette which brings the X-ray film to the vicinity of its transport position. Moreover, the lid comprises at least one spring for disengaging a combination consisting of the X-ray film and a film pressure plate from a further film pressure plate, connected to the lid, and an intensifier screen. The dimensions of the X-ray film are larger than the dimensions of the film pressure plate, so that an edge region of the X-ray film remains free to be engaged by transport means.

DESCRIPTION OF THE PREFERRED EMBODIMENTS

Figure 1:
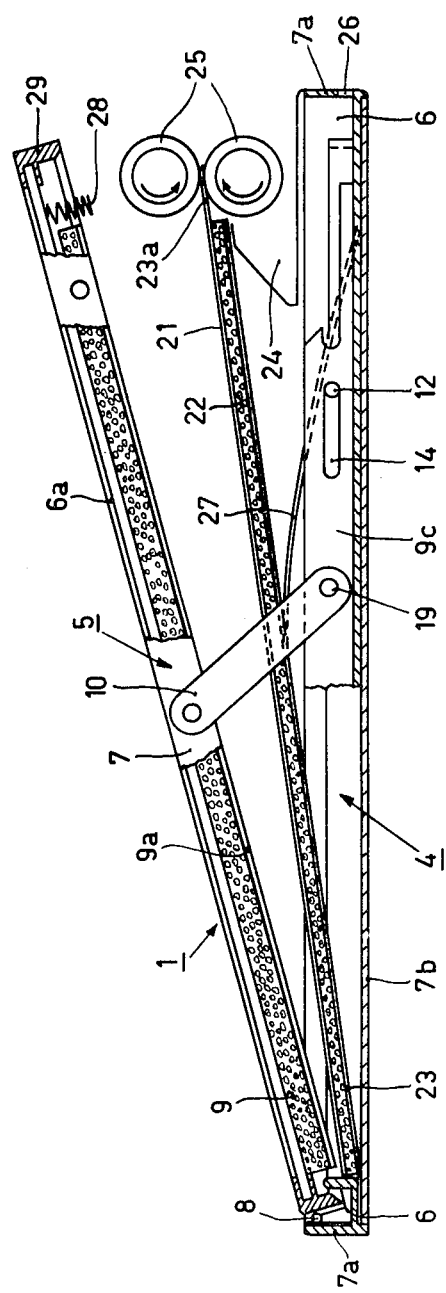
FIG. 1 is a longitudinal sectional view of an X-ray film cassette according to the invention.

The X-ray film cassette 1 has an whose opening side which is placed at the right in the figures. During loading and unloading, for example, cassette 1 is pressed against an abutment 3 (see FIG. 2) by means of a spring 2. Cassette 1 comprises a lower portion 4 and a lid 5. The lower portion 4 has a peripheral rectangular U-profile 7a and 7 has an open upper side and which is closed in a light-tight manner at the bottom by a bottom 7b. The lid 5 comprises a rectangular cover plate 6a which is enclosed by a wall 7 which is perpendicular to the plate. When the cassette is closed, the wall 7 is situated between the U-profile 6 and the U-profile 7a, so that a so-called labyrinth is formed and ingress of light is prevented (see, FIG. 2).

The lid 5 is pivotably connected to the lower portion 4 by means of a hinge 8 which is secured to the lower portion 4 and to the lid 5 opposite the opening side of the cassette (i.e. at the left in FIG. 1). A plate-shaped member 9 of an elastic material, for example, a foamy plastic, is connected to the inner side of the lid 5. The side of member 9 which faces the lower portion 4 of the cassette comprises an intensifier screen 9a (see, FIG. 1) against which an X-ray film 21 is pressed when the cassette is closed.

For opening and closing the cassette, a locking mechanism is provided between the U-profile 6 and the U-profile 7a on each of the two opposite sides (the figures show only the front mechanism). The locking mechanism comprises a slide 9c which is coupled to an arm 10 which is pivotably connected to the lid 5 and the slide 9c. When the slide 9c is displaced, the lid is opened or closed. To this end, two guide pins 11 and 12 (FIG. 2) which are rigidly connected to the lower portion 4 engage two slotted holes 13 and 14 of the slide 9c. Therefore, the slide 9c can be displaced only in the direction perpendicular to the pivot axis of the lid. When the cassette is closed, the slide 9c is slid forward (to the right in FIG. 2) by a spring 15. A locking cam 16 on the front end of the slide 9c then engages behind a pin 17 on the lid 5.

Figure 2:
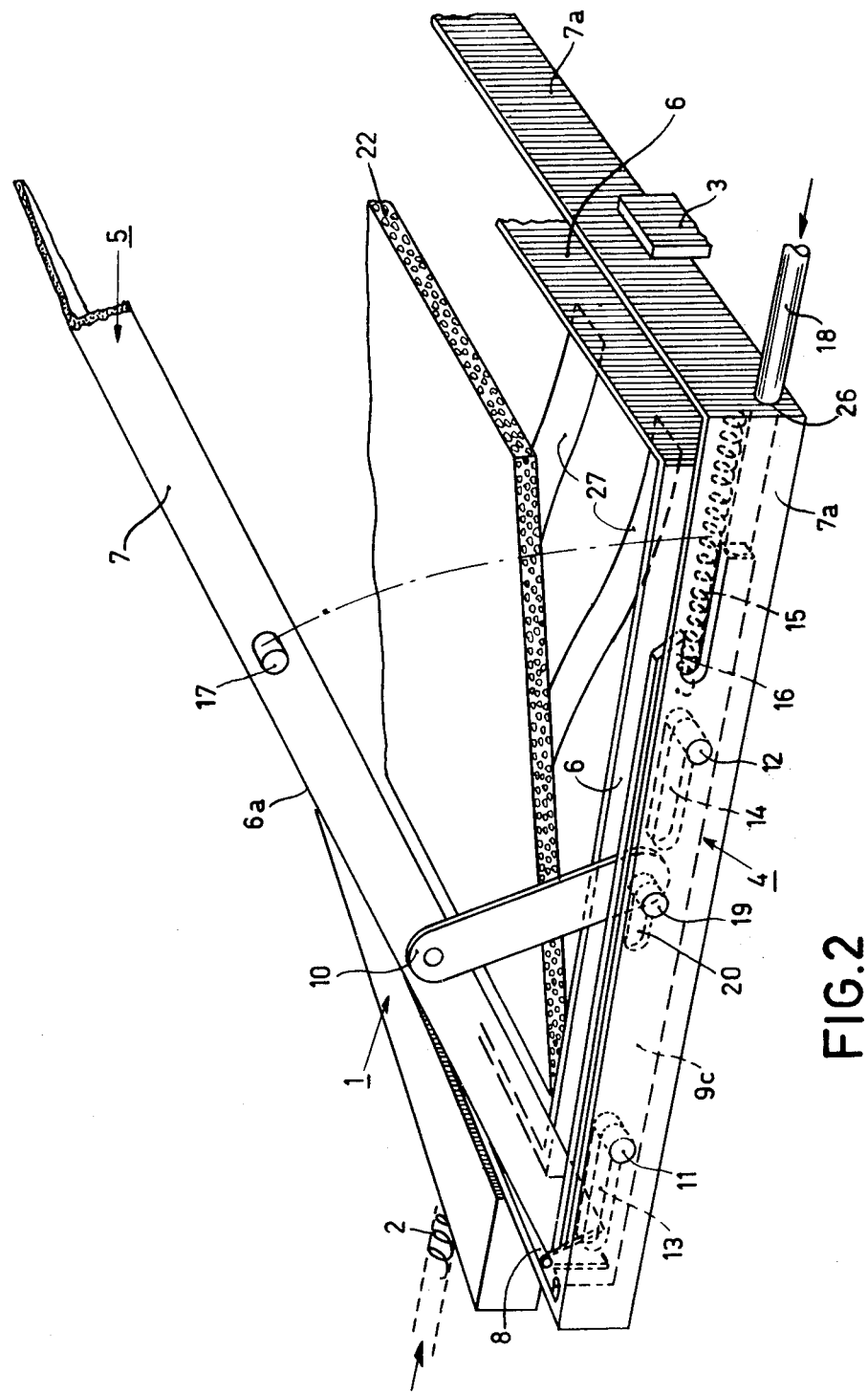
FIG. 2 is a perspective view of a part of the X-ray film cassette shown in FIG. 1.

For opening the cassette, each of the two pins 18 (only one of which is shown in FIG. 2), is slid into an opening 26 in the U-profile 7a, for example by means of a pneumatic drive cylinder, so that the slide 9c is moved from the opening side toward the pivot axis of the lid 5 against the force of the spring 15. During this movement, first a pin 19 which is mounted on the arm 10 is displaced in a further slotted hole 20 in the slide 9c until the pin 19 contacts the right end wall of the slotted hole 20. The lid 5 is then pivoted upward about the axis of the hinge 8 when the slide 9c is displaced further.

When the cassette is closed, the X-ray film 21 is situated in the part of the lower portion 4 which is enclosed by the U-profile 6 and it rests on a pressure plate (22, 23). The pressure plate comprises a plate-shaped body 22 of, for example, a foamy plastic which is glued onto a plate 23. The plate 23 is pivotable at the left-hand side (in a manner not shown for the sake of clarity) about an axis which is parallel to the pivot axis of the lid 5. The film pressure plate consisting of the plate 23 and the plate-shaped body 22, preferably comprising an intensifier screen (not shown), is shorter than the X-ray film 21, so that at the right-hand side (FIG. 1) of the X-ray film an edge region 23a remains which does not bear on the pressure plate.

Between the lower portion 4 and the pressure plate there are provided spring means which comprise several blade springs 27, so that when the cassette is opened, the pressure plate (22, 23) is pivoted upward, with the result that the pressure plate and notably the projecting edge region (23a) of the X-ray film 21 disengage from the bottom 7b of the lower portion 4. The freely projecting edge region 23a of the X-ray film 21 can then be readily engaged by a set of transport rollers 25. The rotatable transport rollers 25 are arranged on a preferably wedge-shaped positioning device 24 which can be introduced, guided by the lower portion 4, into the opening side of the cassette so that the pressure plate (22, 23) is placed in a defined position in which the X-ray film 21 extends exactly between the two transport rollers 25.

In order to prevent the X-ray film 21 from adhering to the intensifier screen 9a (connected to the pressure plate 9) when the cassette is opened, the portion of the lid 5 which is situated opposite the edge region 23a of the X-ray film comprises a helical spring 28 which presses against the edge region 23a and which ensures that the X-ray film 21 indeed disengages from the intensifier screen 9a. Because in the closed condition of the cassette the edge region 23a of the X-ray film is not contacted by the pressure plates (9; 22, 23) or the intensifier screens 9a present thereon, the edge region 23a is (substantially) not exposed during an X-ray exposure. This offers the advantage that patient data or other data can be recorded on the edge region 23a in a further station. In order to prevent direct exposure of the X-ray film 21 to gamma quanta, the lid 5 may be covered with a lead plate at the area of the edge region 23a.

In the same position in which the cassette is unloaded by removal of the X-ray film, it can be loaded again by introduction of another X-ray film. For this purpose it is merely necessary to reverse the drive direction of the transport rollers 25.

What is claimed is:

1. An X-ray film cassette comprising:
   a bottom;
   a lid pivotably connected to the bottom, said lid and bottom defining a storage space therebetween in which an X-ray film can be situated;
   a locking mechanism which defines the positions of the lid and the bottom when the cassette is either opened or closed; and
   bottom spring means for retaining the X-ray film in a fixed position with respect to the bottom and the lid when the cassette is closed, and for releasing the X-ray film for transport from the cassette when the cassette is opened;
   characterized in that:
   the cassette further comprises a bottom pressure plate on which X-ray film bears, said bottom pressure plate having dimensions smaller than the dimensions of the X-ray film, an edge region of the X-ray film remaining free to be engaged by transport means;
   the bottom spring means brings the X-ray film and the bottom pressure plate to a transport position when the cassette is opened; and
   the lid comprises a lid pressure plate and intensifier screen attached thereto, and a lid spring for disengaging the X-ray film and bottom pressure plate from the lid pressure plate and intensifier screen when the cassette is opened.

* * * * *